INVENTORS
SAMUEL AVENA
ROBERT L. LEINER
BY William V. Ebs
THEIR ATTORNEY

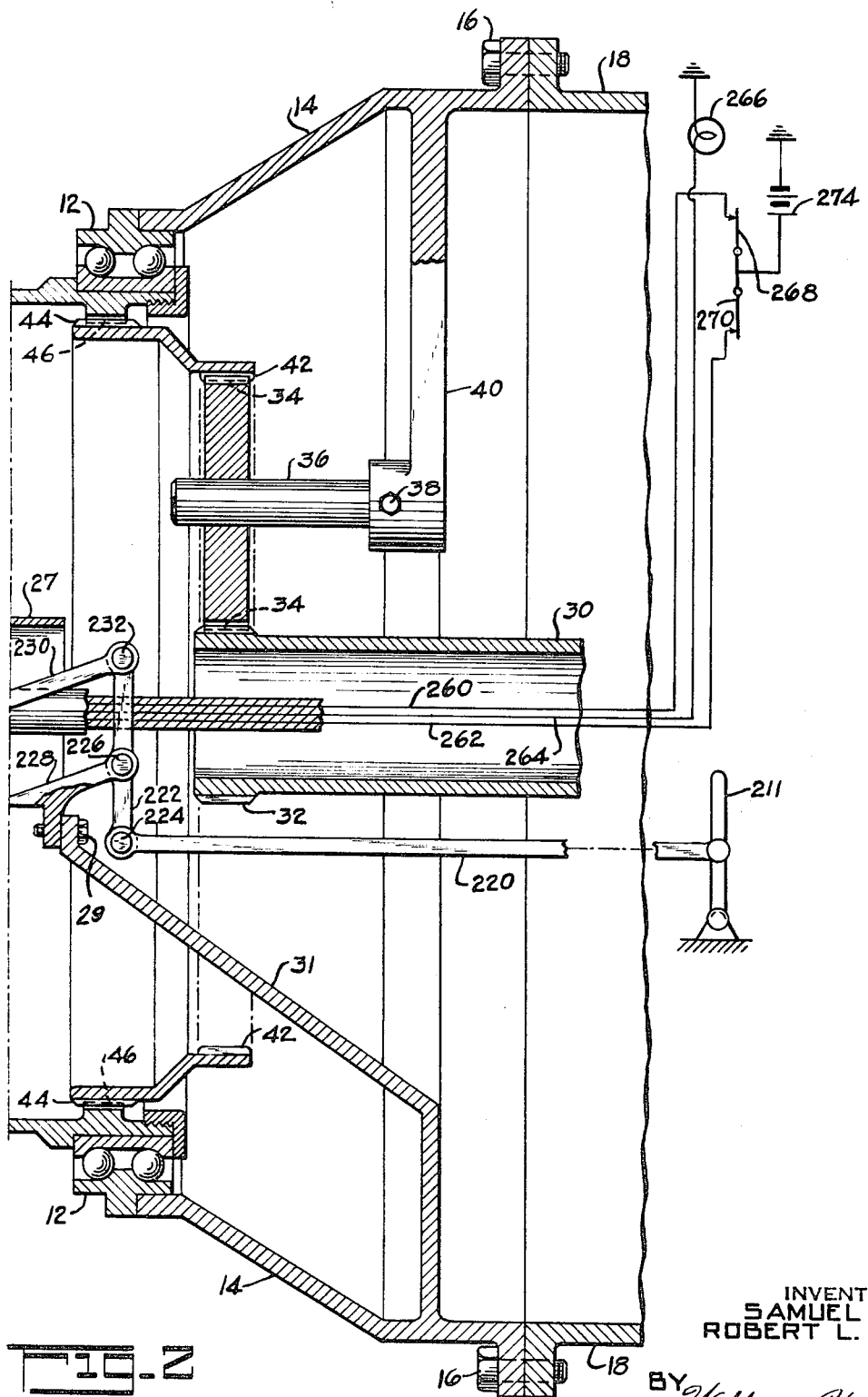

United States Patent Office 3,395,763
Patented Aug. 6, 1968

3,395,763
HYDRAULIC CONTROL SYSTEM FOR
VARIABLE PITCH PROPELLER
Samuel Avena, Newark, and Robert L. Leiner, Butler,
N.J., assignors to Curtiss-Wright Corporation, a corporation of Delaware
Filed Sept. 22, 1965, Ser. No. 489,144
15 Claims. (Cl. 170—160.32)

Our invention relates to variable pitch propellers. More particularly, the invention relates to a hydraulically operable control system for effecting pitch adjustments of a propeller blade.

In vertical take-off and landing aircraft utilizing propellers with tiltable axes of rotation for lift, propulsion and attitude control, it is essential to minimize the likelihood of a propeller suffering a marked loss in blade pitch due to a mal-function in the propeller control system. The hydraulic propeller control system of the invention, while not limited in application to such vertical take-off and landing aircraft, is nevertheless particularly suited to use therein because of its capability of maintaining control of propeller blade angle under adverse conditions. In fact, the maintenance of such capability in an aircraft propeller is a principal object of the invention.

It is another object of the invention to provide an improved hydraulic control system capable of preventing an uncontrolled decrease in the pitch of blades of a propeller following a loss in hydraulic pressure in one portion of the system.

Another object of the invention is to provide an improved hydraulic propeller control system which is arranged to prevent an uncontrolled increase or decrease in propeller blade angle due to a stuck valve.

Still another object of the invention is to provide a propeller pitch control system in which two independent hydraulic circuits normally operate simultaneously in response to a control input signal to effect a blade angle change, but wherein either circuit will operate in response to the control input signal to effect a blade angle change if the other circuit becomes ineffective.

It is a further object of the invention to provide a hydraulic control circuit in which each of a plurality of pumps obtaining fluid from a common sump supplies pressurized fluid to all of a plurality of cylinders and wherein valve means between each cylinder and the sump regulates pressure in the cylinder to control movements of actuating pistons in the cylinders.

It is yet another object of the invention to provide a hydraulic control system in which multiple interconnected pistons providing an output signal are simultaneously controllable according to the operation of one or more of a plurality of valves which are interconnected to enable simulaneous operation of all the valves or the operation of less than all of the valves in the event one or more valves is prevented from functioning.

It is also an object of the invention to provide a hydraulic control system having improved self-checking detecting means for determining the occurrence of a loss in pressure in the system.

Other objects and advantages of the invention will become apparent during a reading of the specification taken in connection with the accompanying drawings in which:

FIG. 2 is a continuation of the drawing of FIG. 1 and shows the remaining portion of the propeller.

Figure 1:
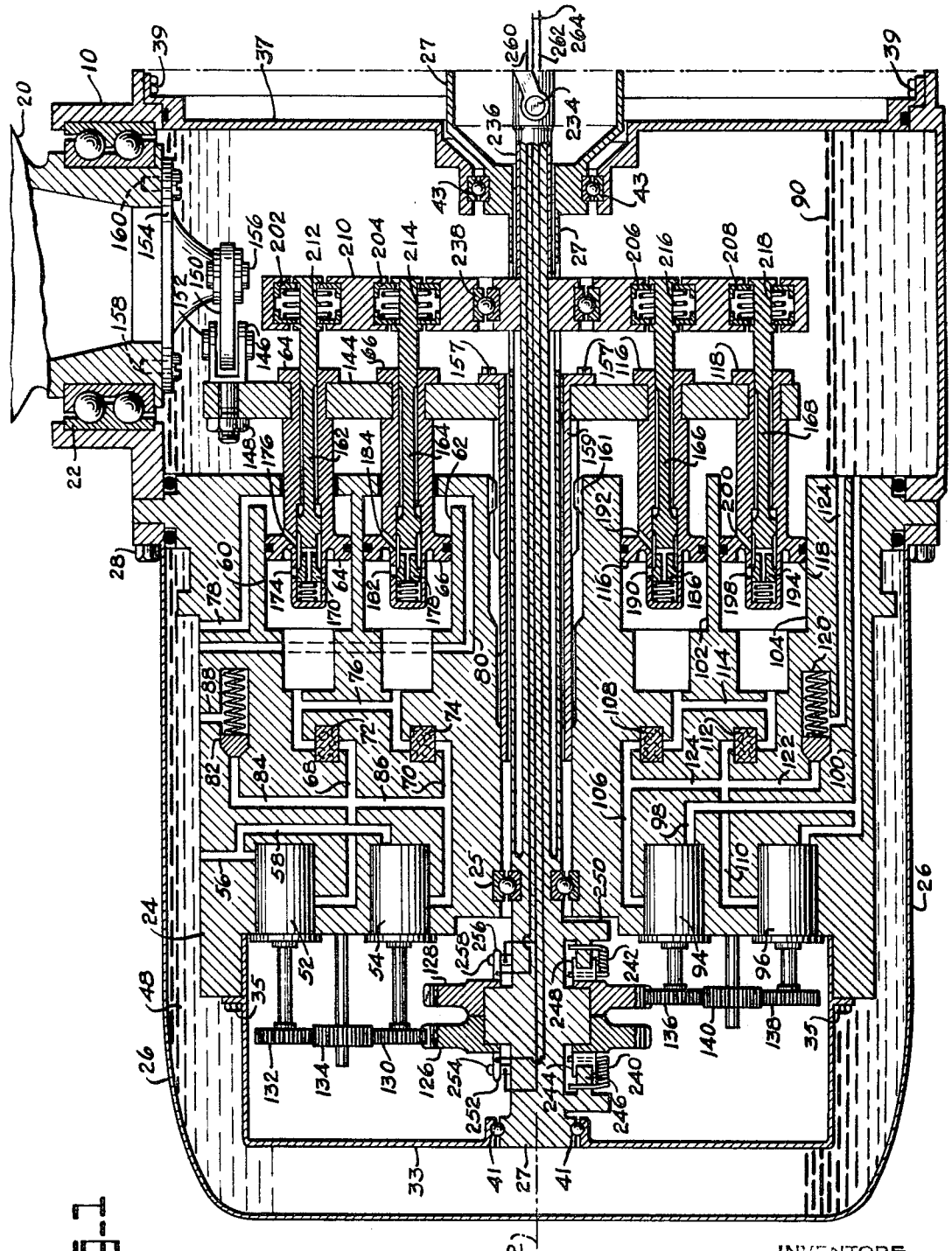
FIG. 1 is a longitudinal vertical sectional view diagrammatically illustrating one portion of a variable pitch hydraulically controlled propeller according to the invention.

Referring to the drawing, reference character 10 designates the propeller hub which, as shown, is mounted on bearing 12 for rotation in housing 14. The housing 14 may be secured as at 16 to an engine casing 18. Propeller blades, of which one is shown at 20, are rotatably mounted on bearings such as 22 in the hub 10 for pitch changing movements according to the operation of hydraulic control means contained by structure 24. Structure 24 and a sump cover 26 are secured to the hub at 28. Structure 24 houses bearings 25 which support a nonrotatable structural member 27. As shown, the member 27 is secured at 29 to a member 31 integral with housing 14. A cover 33 secured at 35 to structure 24 and a fluid confining wall 37 secured at 39 to the hub 10 are mounted on the bearings 41 and 43, respectively, for rotation on the said structural member 27.

The hub 10, structure 24 and cover 26 are rotated by drive shaft 30 through reduction gearing shown as comprising gear 32 formed on shaft 30, gear 34 meshing with gear 32 and rotatably mounted on a shaft 36 that is affixed as at 38 to an integral portion 40 of housing 14, internal ring gear 42 in mesh with gear 34, external ring gear 44 and internal ring gear 46 which is formed on hub 10 and meshes with gear 44.

Two completely independent hydraulic control circuits are provided for controlling propeller blade angle change. Each such circuits includes its own sump for hydraulic fluid, a plurality of fluid pumps which are preferably positive displacement pumps, means for conveying fluid from the sump to the pumps, a plurality of cylinders, fluid carrying means connecting the pumps with the cylinders, a piston in each of the cylinders and connections between the cylinders and sump. In each of the indepedent circuits, each pump connects with all of the cylinders of the circuit. Preferably, two pumps and an equal number of cylinders (each with an output piston) are provided for each circuit as shown in the drawings, although it should be appreciated that a greater number of pumps and/or cylinders may be provided if desired.

In the propeller as shown in the drawings, a first independent hydraulic circuit includes a forward sump 48 between cover 26 and the opposing walls of structure 24 and cover 33, the fluid pumps 52 and 54 with lines 56 and 58 for supplying fluid to the pumps, cylinders 60 and 62, piston 64 in cylinder 60 and piston 66 in cylinder 62, lines 68 and 70 between the pumps and cylinders including filters 72 and 74, respectively, conduit 76 between lines 72 and 74, and lines 78 and 80 connecting cylinders 60 and 62, respectively, to the sump 48. The said system also includes a normally closed relief valve 82 which is provided to prevent excessive pressures in the system and which connects by way of lines 84 and 86 with lines 68 and 70 and by way of line 88 with sump 48. Each of the pumps 52 and 54 can supply pressurized fluid to both of the cylinders 60 and 62 since each such pump 52 and 54 is not only directly connected to one cylinder, that is, by way of line 68 or 70, but is also connected by way of the line 76 to the other cylinder.

The second independent hydraulic circuit in the propeller includes sump 90 located in the region of the hub between structure 24 and wall 37, pumps 94 and 96 along with the lines 98 and 100 for conveying fluid from the sump 90 to the pumps, cylinders 102 and 104, line 106 including filter 108 for supplying fluid from pump 94 to cylinder 102, line 110 including filter 112 for supplying fluid from pump 96 to cylinder 104, line 114 to connect pump 94 with cylinder 104 and pump 96 with cylinder 102, piston 116 in cylinder 102 and piston 118 in cylinder 104 and the relief valve 120 including the lines 122 and 124 connecting the valve with lines 106 and 110 and line 124 connecting the valve with sump 90.

Pumps 52 and 54 in the one circuit and pumps 94 and 96 in the other circuit are driven upon rotation of structure 24 in which they are secured through suitable gearing shown as including reaction gears 126 and 128, gear 130 on the drive shaft of pump 54 in mesh with the gear 126, gear 132 on the drive shaft of pump 52 drivably connected with gear 126 through idler 134, gear 136 on the drive shaft of pump 94 in mesh with gear 128 and gear 138 on the drive shaft of pump 96 drivably connected with the gear 128 through idler 140 and gear 136.

Although the pumps 52, 54, 94 and 96 have all been shown in the same plane in order to simplify the drawing, they would ordinarily be spaced about structure 24 at equal distances from each other and be located at the same radius. With all pumps at the same radius, idlers 134 and 140 would be omitted and the gears 132 and 138 caused to directly engage gears 126 and 128 respectively. The cylinders 60, 62, 102 and 104 with the pistons therein, although shown in a common longitudinal plane with the pumps to simplify the drawing, would also ordinarily be spaced about the structure 24, preferably at equal distances apart and at the same radius.

Pressurized fluid is delivered in the one hydraulic circuit by the pumps 52 and 54 to the cylinders 60 and 62, and in the other hydraulic system by the pumps 94 and 96 to the cylinders 102 and 104 while the propeller rotates. Pressure in the cylinders acts against the pistons 64, 66, 116 and 118 tending to move them to the right as viewed in the drawing, and the pistons in turn acting through a mechanical connection with each blade exert a torque on the propeller blades tending to move them in an increase pitch direction. The mechanical connection between the pistons and each of the propeller blades such as the blade 20 includes the yoke 144 to which all of the pistons are secured, member 146 affixed at 148 to the yoke, link 150 pivoted at 152 to the member 146, and member 154 which is pivotally connected at 156 with link 150 and is fixedly connected at 158 and 160 with the blade 20. As shown, the yoke 144 is secured as at 157 to a cylindrical member 159 which spline-connects at 161 to structure 24 for axial movement therein. Aerodynamic forces, which react against the propeller blades as the propeller rotates, act through the mechanical connections between the blades and pistons 64, 66, 116 and 118 in opposition to the pressure in each of the cylinders containing the pistons. The magnitude of the pressure in the cylinders can however be controlled by valve means to: (1) overcome the aerodynamic forces on the blades and produce an increase in pitch; (2) reduce pressure in the cylinders such that the blades are moved by the aerodynamic forces to a decreased pitch position; or (3) maintain a selected blade angle position for a prolonged period.

The valve means includes valve plungers 162 and 164 positionable within central bores of pistons 64 and 66 respectively for controlling pressure in the first hydraulic circuit and valve plungers 166 and 168 positionable within central bores of pistons 116 and 118 respectively for controlling pressure in the second hydraulic circuit. Land 170 on plunger 162 cooperates with port 174 in piston 64 to control the flow of hydraulic fluid from the cylinder 60 to sump 48 through the opening 176 in the piston and line 78 according to the position of the plunger. Similarly, land 178 on plunger 164 cooperates with the port 182 in piston 66 to control the flow of hydraulic fluid from cylinder 66 to sump 48 through the opening 184 in the piston and line 80. Plunger 166 is provided with land 186 which cooperates with port 190 to control the flow of fluid from cylinder 102 to sump 90 through piston opening 192, whereas plunger 168 has land 194 which cooperates with port 198 to control flow from cylinder 104 to sump 90 through piston opening 200.

The plungers 162, 164, 166 and 168 connect at 202, 204, 206 and 208 respectively with a yoke 210 which can be moved axially in the propeller to position the valve plungers in the respective pistons. The plungers are normally moved in unison and caused to occupy like positions in the pistons with respect to coacting ports. Nevertheless, if one or more plungers are prevented from moving, it is possible to position the remaining plungers by moving the yoke 210 since the connections at 202, 204, 206 and 208 are yieldable, the said connections being provided with springs 212, 214, 216 and 218 respectively for this purpose. Motion is normally transmitted through the yoke to the plungers without compression of the springs. However, if a plunger should stick, the spring associated with the stuck plunger is compressed, permitting the others to be moved in the normal manner.

Movement of the yoke 210 is controllable by a pilot's lever 211 through suitable linkages including the link 220, link 222 pivotally connected at 224 with link 220 and at 226 with fixed structure 228, and the link 230 pivotally connected at 232 with link 222 and at 234 with a sleeve member 236 on which the yoke 210 is mounted for rotation at 238.

As mentioned hereinbefore, the gearing for driving the fluid pumps 52, 54, 94 and 96 includes the reaction gears 126 and 128. Such gears, although rotatably mounted on structural member 27, are restrained against rotation by preload springs 240 and 242. Gear 126 is biased by the spring 240 to a position wherein abutment 244 on the gear engages a stop 246 on structural member 27, and gear 128 is biased by spring 242 to a position wherein abutment 248 on the gear engages a stop 250 on the structural member. While the propeller is at rest, that is, not being rotated, the springs 240 and 242 hold the gears 126 and 128 in the said positions wherein a contact 252 on the gear 126 engages a contact 254 on structural member 27, and a contact 256 on gear 128 engages a contact 258 on the structural member.

The contacts 252 and 254 and the contacts 256 and 258 are elements of an electrical system for indicating a loss in fluid pressure in the hydraulic control circuits. Such electrical system includes the wires 260 and 262 which are connected in parallel, and a grounded wire 264. Wire 260 includes normally closed switch 268 and the contacts 256 and 258, whereas wire 262 includes normally closed switch 270 and the contacts 252 and 254. Grounded wire 264 includes lamp 266.

When the propeller is at rest, such that the contacts 252 and 254, and the contacts 256 and 258 are closed, a circuit is completed for lamp 266 from the battery 274 to the grounded wire 264 over the parallel connected wires 260 and 262. The lamp is therefore normally illuminated at such time. Switches 268 and 270 enable a pilot to test the integrity of the circuit while the propeller is at rest. If lamp 266 lights with switch 268 open and 270 closed, and also with switch 270 open and 268 closed, the integrity of the circuit is established. If the lamp is extinguished with switch 268 open and 270 closed, but is lit with switch 268 closed and switch 270 open, there is a defect in wire 262. If the lamp is extinguished with switch 268 closed and 270 open, but is lit with switch 268 open and 270 closed, there is a defect in wire 260.

When the propeller is rotated by drive shaft 30, the gears 126 and 128 provide the reaction torque necessary to drive the fluid pumps through the other drive gears. The torque exerted against the gears 126 and 128 causes them to be slightly rotated against the restraining springs 240 and 242, respectively, out of the position wherein the contacts 252 and 254 and the contacts 256 and 258 are engaged. The circuit for the lamp 266 is opened at the contacts 252 and 254 and the contacts 256 and 258 to prevent the lamp from lighting. Failure of the lamp to light indicates that fluid pressure is being maintained in the two hydraulic control circuits.

In the event of a marked loss in pressure in one hydraulic circuit or the other due, for example, to a loss of fluid occasioned by a leak in the circuit, reaction torque on the gear 126 or 128 operably connected with the circuit sustaining the loss is reduced and at a point determined by the preloading and stiffness of the biasing spring, the gear is moved by the spring into the position wherein the associated contacts 252 and 254 or 256 and 258 are closed to complete an electrical circuit through one of the parallel connected wires 260 and 262 and thereby light lamp 266. Thereafter switches 268 and 270 may be operated to determine the system in which the loss in pressure has occurred. If the lamp lights with switch 268 open and 270 closed, the first hydraulic system has sustained the loss and if the lamp lights with switch 270 open and 268 closed, the other hydraulic system has sustained the loss.

Let it be assumed that the propeller is rotating with the blades set at some preselected blade angle and it is desired to increase pitch. In order to accomplish the desired change in blade angle, lever 211 is moved counterclockwise as viewed in the drawing whereupon the linkages 220, 222 and 230, sleeve member 236 and the yoke 210 are actuated to move plungers 162, 164, 166 and 168 toward the right, that is, in a direction tending to close ports 174, 182, 190 and 198, respectively. Pressure in each of the cylinders is thereby increased whereupon the pistons 64, 66, 116 and 118 are moved toward the right to act on the blades through yoke 144, member 156, link 150 and member 154 in a direction to increase blade angle. If the lever 211 is pivoted clockwise, the valve plungers 162, 164, 166 and 168 are moved toward the left, that is, in a direction tending to open the valve ports 174, 182, 190 and 198. Pressure in the cylinders 60, 62, 102 and 104 is reduced and the blades 20 are moved to a decreased blade angle by the aerodynamic forces on the blades tending to move the blades toward flat pitch.

Substantially no interference with the control function of the propeller is experienced if one of the pumps 52 or 54 in the first hydraulic circuit or one of the pumps 94 or 96 in the other hydraulic circuit should fail to generate pressure, since the other pump in the system wherein the failure occurs will fulfill the function of both pumps supplying pressurized fluid as required to both cylinders in the system through its outlet line, and the line 76 if the failure is in the first hydraulic circuit or the line 114 if the failure is in the other hydraulic circuit. No significant loss in blade angle occurs and only a slight adjustment of the positions of the valve plungers by means of lever 211 is required to maintain the blade angle existing when the pump failed. Pitch increases and decreases are obtained by manipulation of the pilot's lever 211 as already described.

If a loss in pressure occurs in one of the two hydraulic circuits due, for example, to a severe leak rendering such circuit ineffective, the propeller may nevertheless be controlled through the other circuit, which remains unaffected, to prevent the blades from being driven to flat pitch, or to change blade angle in whatever way may be desired. The lamp 266 will light to indicate the occurrence of such pressure loss and thereafter switches 268 and 270 may be used, as described hereinbefore, to determine the hydraulic circuit needing repair.

In the event one of the valve plungers 162, 164, 166 or 168 should become stuck for some reason, the other valve plungers can be operated to control blade angle. As indicated hereinbefore, each of the plungers resiliently connects with the yoke 210 and if one of the plungers sticks, the spring 212, 214, 216 or 218 connecting the plunger with the yoke is compressed while the other plungers move with the yoke in response to an input movement of the pilot's lever 211. Even if a valve plunger should become stuck with the plungers disposed to fully close or fully open all ports, the control function of the propeller remains fully effective and the lever 211 can be used to regulate blade angle and prevent an uncontrolled increase or decrease in pitch.

It should, of course, be understood that this invention is not limited to the construction and the arrangement shown and described, and that various changes and modifications may be made therein by one skilled in the art without departing from the spirit and scope of the invention.

We claim:

1. A hydraulic circuit comprising a sump to contain a supply of fluid, a pair of pumps, means connecting said sump with each of the pumps for supplying fluid thereto, a pair of cylinders each having a piston as a movable end wall to provide an output signal, fluid carrying means between the pumps and cylinders connecting each pump with both cylinders for supplying pressurized fluid thereto, and fluid transfer means between each cylinder and the sump, each such fluid transfer means between a cylinder and the sump including a valve for controlling pressure in the cylinder.

2. A hydraulic circuit as defined in claim 1 with the addition of a common input control member for the valves, and means extending from each valve to the control member for connecting the valve thereto, each such means including a resilient element enabling one valve to be operated by the control member although the other valve is prevented from operating.

3. A hydraulic circuit as defined in claim 1 wherein each piston includes a central bore, and the valve in the transfer means between each cylinder and the sump includes a valve plunger operable in the bore of the piston and in addition a port in the piston through which fluid flow may be controlled according to the relative positions of the plunger and piston.

4. A hydraulic circuit as defined in claim 1 with the addition of a common input control member for the valves, means extending from each valve to the control member for connecting the valve thereto, and an output member operatively connected to both pistons for actuation thereby.

5. A hydraulic circuit as defined in claim 1 with the addition of means interconnecting the pistons for movement as a unit.

6. The combination of claim 5 including an output member operatively connected with the piston interconnecting means for actuation thereby.

7. A hydraulic actuating system comprising a first sump to contain a supply of fluid, first pump means, means connecting the first sump with the first pump means for supplying fluid thereto, a second sump to contain a supply of fluid different from that to be contained by the first sump, second pump means, means connecting the second sump with the second pump means for supplying fluid thereto, a plurality of cylinders each including a piston as a movable end wall, fluid carrying means between the first pump means and a fraction of the said plurality of cylinders for supplying fluid thereto, fluid carrying means between the second pump means and the remaining number of cylinders for supplying fluid to such remaining number of cylinders, fluid transfer means extending between the said fraction of cylinders and the first sump including first valve means for controlling pressure in the said fraction of cylinders, fluid transfer means extending between the said remaining number of cylinders and the second sump means including second valve means for controlling pressure in the said remaining number of cylinders, and an output member operatively connected to the pistons of all of the said cylinders for actuation thereby.

8. A hydraulic actuating system as defined in claim 7 including a common input control member for all the valve means, and means extending from the valve means to the control member for actuation thereby.

9. A hydraulic actuating system comprising a first sump to contain a supply of fluid; a plurality of first pumps;

means connecting the first sump with the first pumps for supplying fluid thereto; a second sump to contain a supply of fluid different from that to be contained by the first sump; a plurality of second pumps; means connecting the second sump with the second pumps for supplying fluid thereto; a plurality of first cylinders each including a piston as a movable end wall; a plurality of second cylinders each including a piston as a movable end wall; fluid carrying means between the first pumps and first cylinders connecting each of the first pumps with all of the first cylinders for supplying fluid thereto; fluid carrying means between the second pumps and second cylinders connecting each of the second pumps with all of the second cylinders for supplying fluid thereto; fluid transfer means extending between each of the first cylinders and the first sump, each such fluid transfer means between a first cylinder and the sump including a valve for controlling pressure in the cylinder; fluid transfer means extending between each of the second cylinders and the second sump, each such fluid transfer means between a second cylinder and the sump including a valve for controlling pressure in the cylinder; and an oupuut member operatively connected to the pistons of all the first and second cylinders for actuation thereby.

10. A hydraulic actuating system as defined in claim 9 including means interconnecting all of the valves and a common input control member operatively connected thereto for simultaneously operating all of the valves.

11. A propeller pitch changing system comprising rotatable structure including a sump to contain a supply of fluid; a pair of pumps mounted to rotate with said structure; rotationally fixed structure; means operably connecting the pumps with the rotationally fixed structure for driving the pumps; means in the rotatable structure connecting said sump with each of the pumps for supplying fluid thereto; a pair of cylinders in the rotatable structure, each having a piston as a movable end wall; fluid carrying means in the rotatable structure between the pumps and cylinders connecting each pump with both cylinders for supplying pressurized fluid thereto; fluid transfer means extending between each cylinder and the sump in the rotatable structure, each such fluid transfer means between a cylinder and the sump including a valve for controlling pressure in the cylinder; a common input control member for the valves; means extending from the valves to the control member for actuation thereby; a plurality of propeller blades; and means operatively connecting each propeller blade with both pistons for pitch changing movement thereby.

12. A propeller pitch changing system comprising rotatable structure including a first and second sump each to contain a separate supply of fluid; first and second pump means mounted to rotate with said structure; rotationally fixed structure; first means operatively connecting the first pump means with the rotationally fixed structure for driving the first pump means; second means operatively connecting the second pump means with the rotationally fixed structure for driving the second pump means; fluid conduit means in the rotatable structure connecting the first sump with the first pump means; other fluid conduit means in the rotatable structure connecting the second sump with the second pump means; a plurality of cylinders in the rotatable structure, each including a piston as a movable end wall; fluid carrying means between the first pump means and one portion of the cylinders for supplying fluid thereto; other fluid carrying means between the second pump means and another portion of the cylinders for supplying fluid to such another portion; fluid transfer means extending between the said one portion of cylinders and the first sump including first valve means for controlling pressure in said one portion of the cylinders; fluid transfer means extending between the said another portion of cylinders and the second sump including second valve means for controlling pressure in the said another portion of the cylinders; a common input control member for the valve means; means extending from the valve means to the control member for actuation thereby; a plurality of propeller blades; and means operatively connecting each propeller blade with the pistons of all of the said cylinders for pitch changing movement thereby.

13. A propeller pitch changing system comprising rotatable structure including a first and second sump each to contain a supply of fluid; a plurality of first pumps mounted to rotate with said structure; a plurality of second pumps also mounted to rotate wih said strucure; rotationally fixed structure; first means operably connecting the first pumps with the rotationally fixed structure for driving the first pumps; second means operably connecting the second pumps with the rotationally fixed structure for driving the second pumps; fluid conduit means in the rotatable structure connecting the first sump with the first pumps; other fluid conduit means in the rotatable structure connecting the second sump with the second pumps; a plurality of first cylinders in the rotatable structure, each including a piston as a movable end wall; a plurality of second cylinders, each including a piston as a movable end wall; fluid carrying means between the first pumps and first cylinders connecting each of the first pumps with all of the first cylinders for supplying fluid thereto; fluid carrying means between the second pumps and second cylinders connecting each of the second pumps with all of the second cylinders for supplying fluid thereto; fluid transfer means extending between each of the first cylinders and the first sump, each such fluid transfer means between a first cylinder and the sump including a valve for controling pressure in the cylinder; fluid transfer means extending between each of the second pumps with all of the second cylinders for supplying fluid thereto; fluid transfer means extending between each of the first cylinders and the first sump, each such fluid transfer means between a first cylinder and the sump including a valve for controling pressure in the cylinder; fluid transfer means extending between each of the second cylinders and the second sump, each such fluid transfer means between a second cylinder and the sump including a valve for controlling pressure in the cylinder; a common input control member for all the valves; means extending from each of the valves for controlling pressure in the first cylinders and from each of the valves for controlling pressure in the second cylinders to the control member for actuation thereby; a plurality of propeller blades; and means operatively connecting each propeller blade with the pistons of all of the first and second cylinders for actuation thereby.

14. A propeller pitch changing system comprising rotatable structure including a sump to contain a supply of fluid; a pair of pumps mounted to rotate with said structure; means operable connecting the pumps with the rotationally fixed structure for driving the pumps including a reaction member and means resiliently connecting said member with the rotationally fixed structure; signaling means operable by the reaction member upon movement thereof in response to more than a predetermined reaction by the pumps; means in the rotatable structure connecting said sump with each of the pumps for supplying fluid thereto; a pair of cylinders in the rotatable structure, each having a piston as a movable end wall; fluid carrying means in the rotatable structure between the pumps and cylinders connecting each pump with both cylinders for supplying pressurized fluid thereto; fluid transfer means extending between each cylinder and the sump in the rotatable structure, each such fluid transfer means between a cylinder and the sump including a valve for controlling pressure in the cylinder; a common input control member for the valves; means extending from the valves to the control member for actuation thereby; a plurality of propeller blades; and means operatively connecting each propeller blade with both pistons for pitch changing movement thereby.

15. In combination, rotatably mounted structure; a pump affixed thereto; rotationally fixed structure; means operatively connecting the pump with the rotationally fixed structure for driving the pump including a drive gear on said pump, an engaging reaction gear rotatably mounted on the fixed structure, spring means between the rotationally fixed structure and said reaction gear, and signaling means operable by the reaction gear upon movement thereof in response to more than a predetermined reaction torque.

References Cited

UNITED STATES PATENTS

| 2,919,680 | 1/1960 | Scharringhausen | 91—411 |
| 3,099,940 | 8/1963 | Leduc | 91—49 |
| 3,196,755 | 7/1965 | Chichester | 91—411 |
| 3,240,275 | 3/1966 | Bennett | 170—160.32 |

EVERETTE A. POWELL, Jr, *Primary Examiner.*